3,027,340
DICARBOXYLIC ACID MODIFIED TRIGLYCERIDE OIL-EPOXIDE COMPOSITIONS

John E. Masters, Louisville, Ky., assignor to Devoe & Raynolds Company, Inc., Louisville, Ky., a corporation of New York
No Drawing. Filed July 19, 1955, Ser. No. 523,102
10 Claims. (Cl. 260—22)

This invention relates to new coating compositions and includes the new compositions and methods of producing them.

The new coating compositions are produced by the reaction of epoxide resins and unsaturated triglyceride oils and by subsequent further reaction with dibasic acid anhydrides, etc. The new compositions are soluble in volatile organic solvents, and films produced therefrom can be baked or air dried.

In my application Serial No. 252,577, filed October 22, 1951, I have described new compositions resulting from the reaction of epoxide resins with unsaturated triglyceride oils. The coating compositions of the present invention result from the further reaction of such reaction products with dibasic acid anhydrides, etc.; and the new compositions can advantageously be produced by a two-step process in which the epoxide resin and triglyceride oils are first reacted and the dibasic acid anhydride, etc., is added and the process continued in the same kettle to produce the new compositions.

The epoxide resins used in making the new compositions are epoxide resins such as result from the reaction of dihydric phenols, particularly bisphenol (p,p'dihydroxy-diphenyldimethyl methane), with epichlorhydrin in the presence of sufficient caustic alkali to combine with the chlorine of the chlorhydrin.

These epoxide resins vary somewhat in their composition and properties. They are essentially polyether derivatives of polyhydric phenols with terminal epoxide groups and contain as their principal or one of their principal constituents diepoxides having the following typical structure.

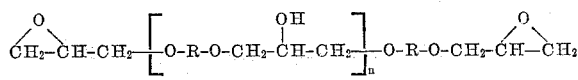

in which R is the residue of the dihydric phenol, e.g., in the case of bisphenol R is $$-C_6H_4-C(CH_3)_2-C_6H_4-$$

and $n$ is the degree of polymerization. These resins vary in melting point or softening point from e.g., around 40 to 155° C. These resins have intermediate alcoholic hydroxyl groups and terminal epoxide groups and can react through either or both of these groups. Such epoxide resins are known under the trade names "Devran" and "Epon" resins.

The triglyceride oils used with the epoxide resins are unsaturated triglyceride oils, or drying oils, such as linseed oil, dehydrated castor oil, soyabean oil, and other unsaturated triglyceride oils.

The dibasic acid anhydrides are dibasic acids which are advantageously used in the form of their anhydrides, and including both the aromatic and aliphatic dibasic acids and anhydrides, such as phthalic acid anhydride, maleic acid anhydride, etc.

In the second step of the process, in which the products of reaction of the epoxide resins and unsaturated triglycerides are further reacted with dibasic acid anhydrides, this further reaction can be modified by addition of other reactants therewith, such as mono and polyhydric alcohols, etc.

In the first step of the process in which epoxide resins are reacted with triglyceride oils, the proportions can be varied as described in said prior application. Proportions as high as 90% of epoxide resin and 10% triglyceride oils can be used, but in general somewhat higher proportions of triglyceride oil are advantageous, such as equal parts of the resin and oil or somewhat more or less than equal proportions, e.g., 60 parts of resin and 40 parts of oil; and the proportion of oil may considerably exceed the amount of resin.

The first step of the process, in which the epoxide resins and triglyceride oils are reacted, is carried out by heating at relatively high temperatures, around 450°–580° F. The time of heating will vary somewhat with the temperature and the extent of the reaction. In general, the resin and oil are heated for a sufficient period of time to obtain a clear pill, i.e., until a drop of the reaction mixture, when placed on a glass plate and allowed to cool to room temperature, remains clear. Further heating results in further reaction and gives intermediate products of increased viscosity.

After this first reaction between the epoxy resins and the triglyceride oils, the dibasic acid anhydride, either alone or with other admixtures, is added and the process is advantageously continued in the same kettle and by adding the anhydride to the hot reaction product of the first step of the process. The resulting coating composition can readily be dissolved in solvents such as volatile hydrocarbon solvents to form solutions containing e.g. 50% solvent and 50% of the reaction product, but the proportion of solvent can be varied.

The reactions which take place between the epoxide resin and the unsaturated triglyceride oil are somewhat complex in nature, involving alcoholysis or ester group transfer between the resin and the oil to form esters of the resins and mono or diglycerides, which may further react to a greater or less extent with the epoxide groups of the resins to form complex intermediate reaction products. The nature and extent of the various reactions which take place during this first step of the process are difficult to determine, but two of the primary reactions seem to be the following:

*Reaction I—Alcoholysis.*—From the above formula, it appears that the resin contains intermediate alcoholic hydroxyls capable of esterification. Reaction of such intermediate hydroxyls by alcoholysis with fatty acids of the triglyceride is illustrated by the following equation:

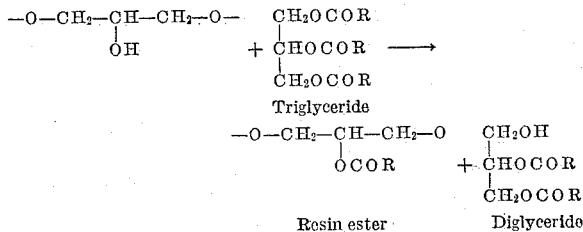

Resin ester      Diglyceride

*Reaction II—Epoxide reaction.*—From the above formula, it appears that one of the reactive groups of the resin is the terminal epoxide group. The reaction of this epoxide group with the diglyceride is illustrated by the following equation:

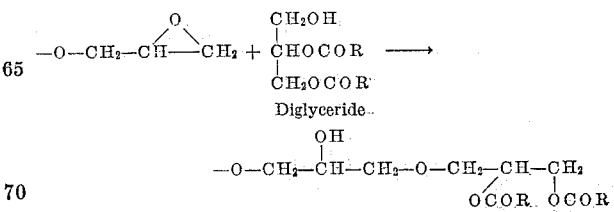

Other reactions may also take place, including ether formation, polymerization with reduction in iodine value, etc.

Depending upon the proportions of epoxide resin and triglyceride oil and the extent of the reaction, it is possible to form intermediate reaction products which still contain reactive epoxide groups which are capable of further reaction in the second step of the process. The products of the first step of the reaction also contain reactive alcoholic hydroxyl groups.

The heating of the epoxide resins and triglyceride oils in the first step of the process can be carried out without the use of a catalyst, but the reactions can be somewhat promoted or modified by the use of small amounts of catalyst, particularly small amounts of alkaline catalysts.

In the carrying out of the second step of the process, there are added to the hot reaction product of the first step dibasic acid anhydrides, and the cooking operation is continued to bring about reaction to produce the final reaction product. The dibasic acid anhydrides can be used alone or they can be used along with other reagents such as are used in the production of alkyd resins such as polyhydric alcohols, such as glycerine, pentaerythritol, etc., in which case these are also present to take part in the reaction between the product of the first step of the process and the added dibasic acid anhydrides. Amounts of dibasic acid anhydride can thus be used varying from around e.g. 1 to 10% or more of the weight of the initial reaction product, and where polyhydric alcohols are also used they may also be used in proportions of e.g. 1 to 10% or more of the initial reaction product.

The invention will be further illustrated by the following examples, but it will be understood that the invention is not limited thereto. The parts are by weight.

Example 1

The epoxide resin used was a complex polyepoxide resin resulting from the reaction of bisphenol and epichlorhydrin in the presence of caustic alkali and having a molecular weight of about 1400, a weight per epoxide of approximately 900, a softening point of 98° C. and containing approximately 4.88 hydroxyl groups on the average per molecule.

1485 parts of refined soya bean oil and 1485 parts of the above resin were placed in a vessel and cooked at a temperature of 530 to 560° F. for 1 hour. 30 parts of phthalic anhydride was added and the mixture cooked for a further period of about 5 hours at 500 to 560° F. The resulting mixture was thinned to 70% solids with xylene. The reaction product had an acid value of 0.25, and the solution had a weight per gallon of 8.18. The solution had a viscosity of $Z_1$–$Z_2$ and a color of 10–11. At 50% solids in the same solvent, the solution had a viscosity of F–G.

Example 2

1200 parts linseed oil and 1680 parts of the resin of Example 1 were placed in a vessel and heated at 480° F. for 2½ hours.

The mixture was cooled to 300° F., 120 parts phthalic anhydride added and heated at 380° F. for one hour additional. The mixture was cooled and thinned to 50% solids with xylene. The product had an acid value of 15.8 and the solution a weight per gallon of 8.00. The solution had a viscosity of $Z_3$–$Z_4$.

Example 3

1400 parts refined soyabean oil and 1440 parts of the resin of Example 1 were placed in a vessel and heated to 540° F. over a period of 1 hour.

The mixture was cooled to 390° F. and 120 parts phthalic anhydride added. The mixture was then heated at 450°–560° F. for five hours. The reaction mixture was thinned to 60% solids with xylene. The product had a weight per gallon of 8.09 and an acid value below 10. The solution had a viscosity of X–Y and a color of 10–11. At 50% solids the solution had a viscosity of N–O.

Example 4

1500 parts dehydrated castor oil and 1320 parts of the resin of Example 1 were placed in a vessel and heated at 560° F. for 1 hour.

The mixture was cooled to 300° F. and 180 parts phthalic anhydride added. The reaction mixture was heated at 380° F. for 1 hour. The reaction mixture was thinned to 49.6% solids with xylene. The product had an acid value of 11.1 and a weight per gallon of 8.00. The solution had a viscosity of $Z_2$ and a color of 7–8.

Example 5

1350 parts dehydrated caster oil and 1470 parts of the resin of Example 1 were placed in a vessel and heated at 560° F. for ½ hour.

The mixture was cooled to 300° F. and 180 parts phthalic anhydride added. The reaction mixture was heated at 380°–400° F. for ½ hour, cooled and thinned to 49% solids with xylene. The product had an acid value of 15.1 and a weight per gallon of 7.96. The solution had a viscosity of X–Y and a color of 7.

Example 6

1500 parts of dehydrated castor oil and 1380 parts of the resin of Example 1 were placed in a vessel and heated to 560° F. over a period of one hour.

The mixture was cooled to 300° F. and 120 parts phthalic anhydride added. The reaction mixture was heated at 400° F. for 1½ hours, cooled and thinned to 50% solids with xylene. The product had an acid value of 2.72 and a weight per gallon of 8.00. The solution had a viscosity of Y and a color of 7.

Example 7

The resin used was a similar epoxy resin to that of Example 1, but with a lower melting point and having a molecule weight of approximately 900, a weight per epoxide of approximately 500, a softening point of about 70° C. and containing approximately 3,11 hydroxyl groups on the average per molecule.

859 parts of linseed oil and 266 parts of the above resin were placed in a vessel and heated at 500° F. for ¾ hour.

The resulting mixture was cooled to 350° F., and 85 parts of phthalic anhydride added. The resulting reaction mixture was heated with xylene reflux at 500° F. for 1½ hours, cooled and thinned to 50% solids with xylene. The product had an acid value of 5.2. The solution had a color of 1 and a viscosity of $A_2$ at 49.4% solids in xylene.

A 3 mil film of the product containing 0.2% (based on solids) lead and 0.03% (based on solids) cobalt was drawn on glass and allowed to air dry. The film dried overnight to a tack free, clear, glossy film.

Example 8

The resin used was a higher melting point epoxide resin made by further reacting the epoxide resin of Example 1 with a small amount of bisphenol, this higher melting point resin having a molecular weight of approximately 2900, a weight per epoxide of approximately 2,000, a softening point of 130° C. and containing approximately 10.7 hydroxyl groups on the average per molecule.

443 parts of linseed oil and 322 parts of the above resin were placed in a vessel and heated at 500° F. for 1½ hours.

The resulting reaction product was cooled and reduced to 50% solids with xylene and 4.5 parts benzyl trimethyl ammonium hydroxide added. 40 parts of phthalic anhydride was added and the solution heated at 220° F. for 1½ hours. The temperature was then increased to 365° F. over a period of about ½ hour and held at that temperature for ½ hour. The product was cooled and thinned to 50% solids with xylene. The product had an acid value of 9.3. The solution had a color of 10 and a viscosity of $Z-Z_1$ at 49.2% solids in xylene.

A 3 mil film containing 0.01% (based on solids) cobalt metal was drawn on glass and baked 30 minutes at 325° F. to give a flexible, clear and glossy film.

*Example 9*

The resin used was a similar epoxide resin to those of the preceding examples but with a molecular weight of approximately 790, a weight per epoxide of approximately 590, a softening point of 84° C. and containing approximately 3.39 hydroxyl groups on the average per molecule.

241 parts of linseed oil and 845 parts of the above resin were placed in a vessel and heated at 500° F. for ¼ hour.

The mixture was cooled to 390° F., 60 parts of glycerol and 60 parts of phthalic anhydride added, and heated with xylene reflux at 400° F. for 1½ hours.

The product was cooled and thinned to 50% solids with Cellosolve acetate. The product had an acid value of 0.56. The solution had a color of 8 and a viscosity of R at 51.5% solids in a solvent mixture of xylene and Cellosolve acetate.

A 3 mil film containing 0.01% (based on solids) cobalt metal was drawn on glass and baked 30 minutes at 325° F. The film was clear, glossy and free of defects.

*Example 10*

483 parts of linseed oil and 604 parts of the same epoxide resin as in Example 7 were placed in a vessel and heated at 480° F. for ½ hr.

The mixture was cooled to 400° F., 60 parts pentaerythritol and 60 parts phthalic anhydride added, and the mixture heated with xylene reflux at 400° F. for 1 hour.

The product was cooled and thinned to 50% solids with xylene. The product had an acid value of 0.25. The solution had a color of 8 and a viscosity of F at 48.8% solids in xylene.

A 3 mil film containing 0.2% (based on solids) lead and 0.03% (based on solids) cobalt metal was drawn on glass and allowed to air dry. After standing overnight the film was tack free, clear, glossy and free of surface defects.

*Example 11*

1701 parts linseed oil and 827 parts of the resin of Example 1 were placed in a vessel and heated to 440° F. over a period of 1 hour.

183 parts glycerine and 340 parts phthalic anhydride were added and the mixture heated at 440° F. for 4½ hours.

The mixture was cooled and thinned to 50% solids in mineral spirits. The product had an acid value of 5.35 and a weight per gallon of 7.51. The solution had a viscosity of $Z_6$ and a color of 18+.

A 3 mil film containing 0.03% (based on solids) cobalt and 0.5% (based on solids) lead was drawn on glass and allowed to air dry. The films dried overnight.

*Example 12*

1920 parts refined soya bean oil and 771 parts of the resin of Example 1 were placed in a vessel and heated to 560° F. over a period of 1 hour.

The mixture was cooled and 45 parts glycerine and 300 parts phthalic anhydride added. The mixture was then cooked at 400°–440° F. for 3½ hours, cooled and thinned to 50% solids with a solvent mixture composed of 5% high solvency hydrocarbon and 95% mineral spirits. The reaction product had an acid value of 6.77 and a weight per gallon of 7.41. The solution had a viscosity of X–Y and a color of 6–7.

*Example 13*

1920 parts refined soya bean oil and 738 parts of the resin of Example 1 were placed in a vessel and heated to 560° F. over a period of about 1 hour.

The mixture was cooled and 91 parts glycerine and 287 parts phthalic anhydride added. The mixture was heated at 440° F. for 3½ hours, cooled and thinned to 65% solids with a solvent mixture consisting of 5% high solvency hydrocarbon and 95% mineral spirits. The product had an acid value of 2.46 and a weight per gallon of 7.74. The solution had a viscosity of U–V and a color of 6–7.

*Example 14*

1200 parts dehydrated castor oil and 1320 parts of the resin of Example 1 were placed in a vessel and heated at 520° F. for 1 hour.

The mixture was cooled and 180 parts phthalic anhydride and 300 parts hydroabietyl alcohol (Hydrolyn A, Hercules Powder Company) added. The reaction mixture was heated at 420° F. for 1 hour, cooled and thinned to 50% solids with xylene. The product had an acid value of 2.57 and a weight per gallon of 8.04. The solution has a viscosity of X–Y and a color of 6–7.

In carrying out the process illustrated by the above examples, the proportions of the materials used and the time and temperature can be varied.

Reaction products produced by the first step of the process can be cooled and stored, and the second step of the process carried out subsequently by reheating the product and adding the dibasic acid anhydride, etc. But the combined two step operation illustrated by the above examples has the advantage that it can be carried out in the same kettle to produce directly the new coating composition.

The new compositions are valuable varnish compositions for use by themselves or blended with other varnish constituents for making coating compositions of various kinds, including paints, enamels, varnishes, etc. They have the advantage that they are readily soluble in organic solvents and give films which will harden by baking or air drying.

Where the first step of the process, in which triglyceride oils react with the epoxide resins, produces reaction products still containing epoxide groups, these can further react during the second step of the process, e.g., with alcoholic hydroxyl groups of the resin or with polyhydric alcohols added or with free dibasic acids. The reaction of the dibasic acid anhydride such as phthalic anhydride appears to be in part an esterification reaction and a cross-linking reaction, and, when added polyhydric alcohols such as glycerol are added, the dibasic anhydride can react in part with the added polyhydric alcohol and in part with hydroxyl groups present in the reaction product of the first step of the process.

The new coating compositions are complex reaction products, in which the products produced by the first reaction between the triglyceride oil and the epoxide resin are further reacted in the second step of the process with the dibasic acid anhydride, etc., to form the final reaction product.

I claim:

1. A process for the production of an improved paint vehicle base from a glycidyl polyether of a dihydric phenol containing alternating glyceryl radicals and the hydrocarbon radicals of the phenol united in a chain by ether oxygen atoms and having at least one alcoholic hydroxyl group and more than one and up to two epoxy groups per average molecule which comprises (1) heating said glycidyl polyether with a fatty drying oil at about 460 to 580° F. until a clear pill of the product on glass at about room temperature is obtained, (2) next adding from about 5 to 10% by weight based on the total weight of the composition of a dicarboxylic acid anhydride and continuing the heating to react the dicarboxylic acid anhydride with the product of step (1), and (3) then adding hydrocarbon thinner to the resulting reaction product to form a solution thereof.

2. The method of producing coating compositions from a glycidyl polyether of a dihydric phenol containing alternating glyceryl radicals and the hydrocarbon radicals of the phenol united in a chain by ether oxygen atoms and having at least on alcoholic hydroxyl group and more than one and up to two epoxy groups per average molecule which comprises heating said glycidyl polyether with a fatty drying oil at a temperature between about 450 to 580° F. until a clear pill of the product on glass at about room temperature is obtained, adding at least about 1% by weight based on the total weight of composition of a dicarboxylic acid anhydride and continuing the heating to react the dicarboxylic acid anhydride with the glycidyl polyether-fatty drying oil reaction product.

3. The method of claim 2 in which the fatty drying oil is an unsaturated triglyceride oil.

4. The method of claim 2 in which the dicarboxylic acid anhydride is heated in admixture with the fatty drying oil-glycidyl polyether reaction product at a temperature between about 350 to 580° F. to form a homogeneous reaction product.

5. The method of producing coating compositions which comprises first heating an unsaturated triglyceride oil and a glycidyl polyether of a dihydric phenol containing alternating glyceryl radicals and the hydrocarbon radicals of the phenol united by a chain of ether oxygen atoms and having at least one alcoholic hydroxyl group and more than one and up to two epoxy groups per average molecule to a temperature of between about 450 to 580° F. until a clear pill of the product on glass at about room temperature is obtained, adding an aliphatic polyhydric alcohol and at least 1% by weight based upon the total weight of the composition of a dicarboxylic acid anhydride and heating the resulting mixture to form a homogeneous reaction product.

6. The method of claim 5 in which the mixture is heated to a temperature between about 350 to 580° F.

7. Coating compositions resulting from the process of claim 2.

8. Coating compositions resulting from the process of claim 5.

9. A solution in a volatile hydrocarbon solvent of the composition of claim 2.

10. A solution in a volatile hydrocarbon solvent of the composition of claim 5.

References Cited in the file of this patent

UNITED STATES PATENTS

| | | |
|---|---|---|
| 2,626,223 | Sattler | Jan. 20, 1953 |
| 2,691,004 | Doyle | Oct. 5, 1954 |
| 2,731,429 | Cody | Jan. 17, 1956 |